US005566159A

United States Patent [19]

Shapira

[11] Patent Number: 5,566,159
[45] Date of Patent: Oct. 15, 1996

[54] OPTICAL DISK READER

[75] Inventor: Shlomo Shapira, Petach Tikva, Israel

[73] Assignee: Zen Research N.V., Netherlands Antilles

[21] Appl. No.: 315,432

[22] Filed: Sep. 30, 1994

[30] Foreign Application Priority Data

Oct. 4, 1993 [IL] Israel ........................................ 107181

[51] Int. Cl.$^6$ ........................................ G11B 7/00
[52] U.S. Cl. ........................ 369/99; 369/32; 369/44.41; 369/112
[58] Field of Search ........................ 369/99, 109, 110, 369/111, 112, 124, 125, 120, 32, 121, 44.11, 44.41, 44.26

[56] References Cited

U.S. PATENT DOCUMENTS

| | | |
|---|---|---|
| 3,085,275 | 4/1963 | Kiemle et al. . |
| 3,748,015 | 7/1973 | Offner . |
| 4,135,251 | 1/1979 | Ruell . |
| 4,298,974 | 11/1981 | Tsunoda et al. . |
| 4,428,647 | 1/1984 | Sprague et al. . |
| 4,486,870 | 12/1984 | Pettigrew et al. . |
| 4,536,866 | 8/1985 | Jerome et al. . |
| 4,581,529 | 4/1986 | Gordon . |
| 4,841,514 | 6/1989 | Tsuboi et al. . |
| 5,033,043 | 7/1991 | Hayakawa . |
| 5,065,387 | 11/1991 | Roth et al. . |
| 5,081,617 | 1/1992 | Gelbart . |
| 5,111,445 | 5/1992 | Psaltis et al. . |
| 5,128,919 | 7/1992 | Narahara et al. . |
| 5,150,347 | 9/1992 | Yanagi . |
| 5,181,161 | 1/1993 | Hirose et al. ........................... 369/109 |
| 5,231,627 | 7/1993 | Paul et al. . |
| 5,233,583 | 8/1993 | Reno . |
| 5,247,510 | 9/1993 | Lee et al. ........................... 369/112 |
| 5,253,245 | 10/1993 | Rabedeau . |
| 5,258,970 | 11/1993 | Kobayashi ........................... 369/109 |
| 5,265,085 | 11/1993 | Jaquette et al. ........................... 369/99 |
| 5,293,569 | 3/1994 | Koyama ........................... 369/112 |
| 5,295,125 | 3/1994 | Oonishi . |
| 5,313,441 | 5/1994 | Imai et al. ........................... 369/112 |
| 5,365,535 | 11/1994 | Yamaguchi et al. . |
| 5,394,385 | 2/1995 | Sakurada et al. . |
| 5,420,840 | 5/1995 | Bec . |
| 5,426,623 | 6/1995 | Alon et al. . |
| 5,438,563 | 8/1995 | Oshiba et al. . |

FOREIGN PATENT DOCUMENTS

| | | |
|---|---|---|
| 831264 | 11/1975 | Belgium . |
| 092420 | 10/1983 | European Pat. Off. . |
| 569718 | 11/1993 | European Pat. Off. . |
| 2120001 | 11/1983 | United Kingdom . |

OTHER PUBLICATIONS

D. F. Barbe, "Time delay and integration image sensors", Solid State Imaging, P. G. Jespers et al., Nordhoff, The Netherlands, pp. 659–671 (1976).

"Offnet 1:1 system: some further uses", M. V. R. K. Murtz, Optical Engineering, vol. 24, No. 2, pp. 326–328 (Apr., 1985).

Patent Abstracts of Japan, vol. 12, No. 138 (P–695) 27 Apr. 1988 & JP–A–62 259 239 (Hitachi) 11 Nov. 1987–abstract.

Patent Abstracts of Japan, vol. 9, No. 24 (P–331) 31 Jan. 1985 & JP–A–59 168 942 (Matsushita Denki Sangyo K K) 22 Sep. 1984–abstract.

Patent Abstracts of Japan, vol. 9, No. 86 (P–349) 16 Apr. 1985 & JP–A–59 215 033 (Hitachi Seisakusho K K) 4 Dec. 1984–abstract.

Patent Abstracts of Japan, vol. 14, No. 8 (P–987) 10 Jan. 1990 & JP–A–01 258 228 (Sony Corp) 16 Oct. 1989.

*Primary Examiner*—Loha Ben
*Attorney, Agent, or Firm*—Lerner, David, Littenberg, Krumholz & Mentlik

[57] ABSTRACT

An optical disk reader system comprises (1) a wide area illumination source for illuminating at least a part of one track of an optical disk; (2) a detector for detecting light reflected from the optical disk illuminated by the wide area illumination source; and (3) a detector for summing the light in the along-track direction detected by the detector.

5 Claims, 2 Drawing Sheets

OPTICAL DISK READER

FIELD OF THE INVENTION

The present invention relates to optical memory disks and more particularly to readers of optical memory disks with enhanced data densities and enhanced throughput. More particularly, the invention relates to optical disk readers which utilize wide area illumination sources.

BACKGROUND OF THE INVENTION

Optical disks of various kinds are made of circular plates with reflecting coating material which have concentric circular or spiral tracks on which the data is written in the form of spots of changes of some optical property of the disk coating media. These changes are typically spots of lower reflection than the non data-containing parts of the disk. These data spots are spread along a spiral or circular path on the disk. The disk is divided into sectors, and each loop of this spiral path that lies within a sector is called a track.

Data is read from the optical disk by an electro optical head which projects a high brightness focused laser beam on the rotating disk. The reflected light from the disk is detected and transduced into an electrical signal. At any point in time the electro-optical head reads one data spot. Rotation of the disk enables reading a track spot by spot. In order to read data from inner or outer tracks, the electro-optical head is moved to the desired track position by a motor. The reading of the data is done serially along a spiral path.

Data transfer rates of commercially available CD-ROMs (Compact Disk—Read Only Memory) is about 157 KByte/sec. CD-ROMs memory storage capacity is limited to about 640 MBytes (see, e.g., the publication E-93176 PCO-0032, 4/87 to Philips and DuPont Optical). The limit of the memory storage capacity is a function of the wavelength and the numerical aperture of the objective lens. One known way to increase memory capacity in all sorts of optical memory disks, such as CD-ROMs, WORM (Write Once Read Many) disks, and magneto-optical disks, is to decrease the wavelength of the light emitted by the diode laser which illuminates the data tracks of the optical memory disk. Wavelength reduction results in smaller data spots on the disk and thus leads to higher resolutions and enhanced data densities. Current CD-ROMs employ wavelength of 780 nanometers (nm).

The advent of new diode lasers which emit, for example, blue light (around 481 nm) raises the potential of enhancing optical disk data density. However, blue light diode lasers still emit low energies which are not (yet) suitable for the process of reading/writing on an optical disk. Moreover, they are expensive and have very short operating life.

Another way to achieve blue radiation is by frequency doubling of infrared laser by non-linear optical material. However, such systems have very low efficiency and are not yet commercially available ("Compact Blue Laser Devices Based on Non-Linear Frequency Upconversion". W. P. Risk and W. lenth, IBM Research Division, SPIE Vol. 7104, 1989).

In an article by Demetri Psaltis, "Parallel Optical Memories", *BYTE Magazine*, September 1992, pp. 179, parallel access to optical disks is mentioned by illuminating the disk with a broad optical beam instead of a tightly focused spot. It is further mentioned that an increase in storage density is required and this can be achieved by development of shorter wavelength semiconductor lasers because the minimum area required for storing a pixel is equal to a wavelength squared.

In another article by D. C. Kowalski et at., "Multichannel digital optical disk memory system", *Optical Engineering*, Vol. 22, No. 4, July/August 1983, pp. 464, there are described write and read optical head of optical disk systems which employ gas lasers for writing and reading data. The writing laser is a high power argon laser and the reading is done by a lower power HeNe laser. Both lasers are expensive and bulky when compared to solid state diode lasers used in commercial devices.

Other prior art systems are described in an article by Demetri Psaltis, "Optical memory disks in optical information processing", *Applied Optics*, Vol. 29, No. 14, May 10, 1990, and in U.S. Pat. No. 5,111,445 to Psaltis et at.

In U.S. patent application Ser. No. 043,254 filed on Apr. 6, 1993 (corresponding to EP 93105995.0), the description of which is incorporated herein by reference, an optical reading mechanism of optical disks is described which enables readout of many tracks in parallel by employing a CCD/TDI detector matrix, a laser diode illumination system, and an image processor apparatus for tracking and detecting.

So far, prior art systems have employed laser diodes for illuminating optical disks, or has sought to improve the performance of optical disk systems by providing more sophisticated lasers, as described above. The prior art systems, however, present severe drawbacks, particularly because of the high cost of providing improved laser light for CD illumination purposes. It is therefore clear that it would be highly desirable to be able to provide improved systems which do not require such expensive or low efficiency laser sources.

SUMMARY OF THE INVENTION

It has now been found, and this is an object of the present invention, that it is possible to read data from a CD track without using light from a high efficiency laser source.

It has further been found, and this is another object of the invention, that its possible to read data from the tracks of a CD, using a wide area illumination, such as a simple LED, and that using light from a LED can be advantageously exploited to improve the rate of data reading from a CD.

It is accordingly an object of the invention to provide a readout system for optical disks with enhanced data density capabilities.

It is still a further object of the invention to provide an optical disk readout system with higher data retrieve rates.

The optical disk reader system according to the invention comprises:

a wide area illumination source for illuminating at least a part of one track of an optical disk;

means for detecting light reflected from the optical disk illuminated by the said wide area illumination source; and means for summing the light in the along-track direction detected by the said detecting means.

According to a preferred embodiment of the invention, the means for detecting light reflected from the optical disk and for summing the contributions of the said reflected light, comprise a CCD/TDI detector. Such CCD/TDI detector may be of the type described, e.g., in the aforementioned U.S. patent application Ser. No. 043,254.

According to a preferred embodiment of the invention, the system comprises:

a wide area illumination source for illuminating at least one track of an optical disk;

an optical system for projecting at least part of the beam from said wide area illumination source onto the optical disk, and for imaging the illuminated area of the disk onto a detector;

a detector for detecting said beam reflected from said optical disk and for converting said detected light into an electric signal; and a processor for processing said electric signal.

A preferred illuminator is a LED illuminator. Accordingly, in still another preferred embodiment of the invention the illuminator system comprises at least one Light-Emitting-Diode (LED) illuminator and a bandpass filter for passing at least part of the light emitted by the said LED illuminator.

As will be appreciated by the skilled person, employing solid state wide-area and wide-band illumination systems, such as LEDs, instead of narrow-band tightly focused illumination systems enables to provide CD-ROMs which operate at shorter wavelengths without using expensive and bulky laser systems and without using a diffraction limited illumination source.

A system according to the present invention also comprises a detector matrix which i adapted to gather light from large areas on an optical disk. As will be understood by the skilled person, and as more fully described in the aforementioned copending U.S. patent application, the system of the present invention can be used as described in the said application to enable parallel read-out of a plurality of tracks at the same time.

All the above and other characteristics and advantages of the invention will be more fully appreciated through the following illustrative and non-limitative description of preferred embodiments thereof, with reference to the appended drawings.

DETAILED DESCRIPTION OF PREFERRED EMBODIMENTS

Figure 1:
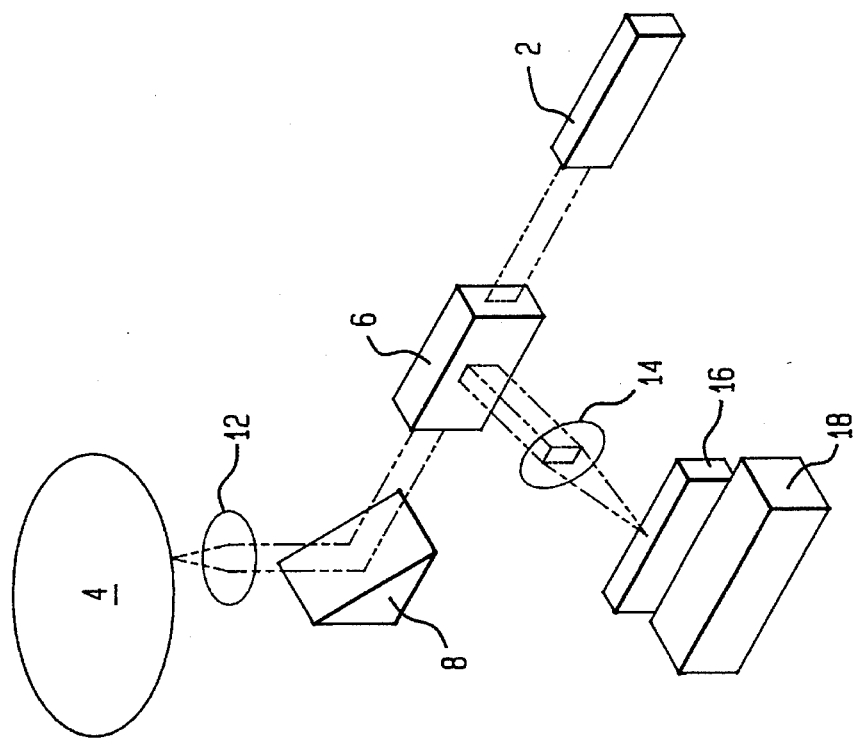
FIG. 1 is a generalized block diagram illustration of an optical memory disk reader in accordance with a preferred embodiment of the invention.

Reference is made to FIG. 1 which is a block diagram of a CD-ROM electro-optical readout head constructed and operative with a preferred embodiment of the invention. A Light-Emitting-Diode (LED) illumination system 2 illuminates a disk 4 via an optical system which includes a beam splitter 6, a mirror 8 and an objective lens system 12. The light reflected from the disk surface is collected by objective lens 12 and reflected by mirror 8 to the direction of the beam-splitter 6. At the beam-splitter 6 the light is reflected towards a tube lens 14. The tube lens 14 together with the objective 12 form a microscope which images the disk and corrects chromatic aberrations which are generated due to the wide-band illumination system. The light from tube lens 14 falls on a CCD/TDI detector matrix 16. Alternatively, detector matrix 16 may be a CCD detector matrix.

The TDI (Time Delay and Integration) 16 includes a plurality (tens or hundreds) or parallel lines, which contains a large number (hundreds or thousands) of detectors. The electrical charge generated by the light falling on each detector in the lines can be transferred to the neighboring detector of the adjacent line of detectors, and be summed with the charge of the neighboring detector. If the transfer of charge from one line of detectors is synchronized to the movement of the data spot along the detectors columns, the charges generated by a moving data spot on the detectors that lie on one of the columns are summed by this transfer to give a stronger signal at the last row of detectors. The charge from the last row is transferred to a readout shift register. Each shift register is connected to a segment of the last row of detectors, and the charge from the detectors of the segment is transferred thereto. The charge from each cell of the shift register is read out serially. The readout rate from the shift register is approximately the transfer rate of one detector divided by the number of detectors connected to the shift register. The readout data rate from the shift registers limits the transfer rate of charges from row to row. Since the transfer of charge from row to row is synchronized to the movement of the data spot on the detector matrix, the readout rate must be equal to the data rate of the optical disk. Therefore, the number of detectors connected to each shift register should fit the required readout rate and the detector transfer rate. For example, for a disk with a data rate of 16 Mspot/sec. and a CCD detector with a transfer rate of 60 Mhz, each shift register is connected to four detectors.

In another preferred embodiment of the invention the detector matrix may be any kind of detector array which integrates signals generated in a multiplicity of detectors.

The light detected by detector matrix 16 is converted in the detector matrix into an electric signal which is processed in image processing unit 18.

Figure 2A:
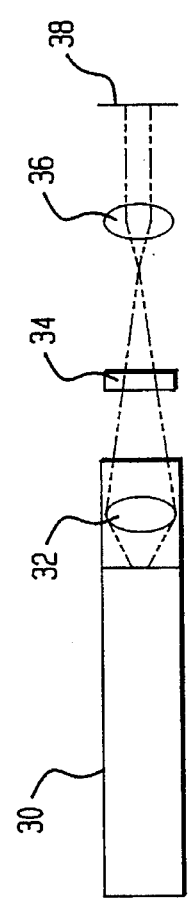
FIGS. 2A and 2B constitute alternative illustrations of illumination systems which may be employed with a system in accordance with a preferred embodiment of the invention.
Figure 2B:
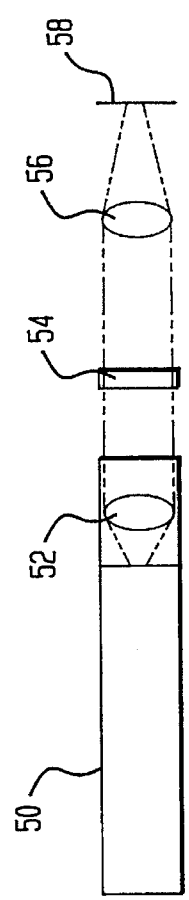

Referring now to FIGS. 2A and 2B, alternative embodiments of illumination systems which may be used with a preferred embodiment of the invention are shown. FIG. 2A illustrates a KOHLER illumination system in accordance with a preferred embodiment of the invention. Light from a LED array 30 is focused by a projection lens 32 onto the aperture of the objective lens 36. A bandpass filter 34 passes the light concentrated in the main wavelengths so that the illumination bandpass is reduced to the bandpass corrected by the tube lens 14 of FIG. 1. Alternatively, if the corrected bandpass is large enough the bandpass filter may be eliminated. The light is then focused at the back focal plane of an objective lens 36. Objective lens 36 condenses the light into a beam which uniformly illuminates a disk 38.

FIG. 2B illustrates a CRITICAL illumination system in accordance with a preferred embodiment of the invention. A LED array 50 illumination source is positioned at the focal plane of a projection lens 52. The projection lens 52 collimates the light into a parallel beam. A bandpass filter 54 passes the light which is concentrated in the main wavelengths so that the illumination bandpass is reduced to the bandpass corrected by the tube lens 14 of FIG. 1. Alternatively, if the corrected bandpass is large enough the bandpass filter may be eliminated. The light is then focused by an objective lens 56 on a disk 58.

The systems of FIGS. 2A and 2B may be provided with various types of LED arrays 30 and 50, such as a single LED, a LED array with an attached lens array, or pigtailed LED array. These systems can be provided with various types of laser arrays replacing 30 and 50, such as a single laser, a laser array, a laser array with lens array, or pigtailed laser array.

It should be noted that the systems of FIGS. 2A and 2B may be provided without separate bandpass filters 34 and 54 respectively. In that case the beam-splitter 6 of FIG. 1 may be coated with a suitable coating layer which provides the required filtering.

Figure 3:
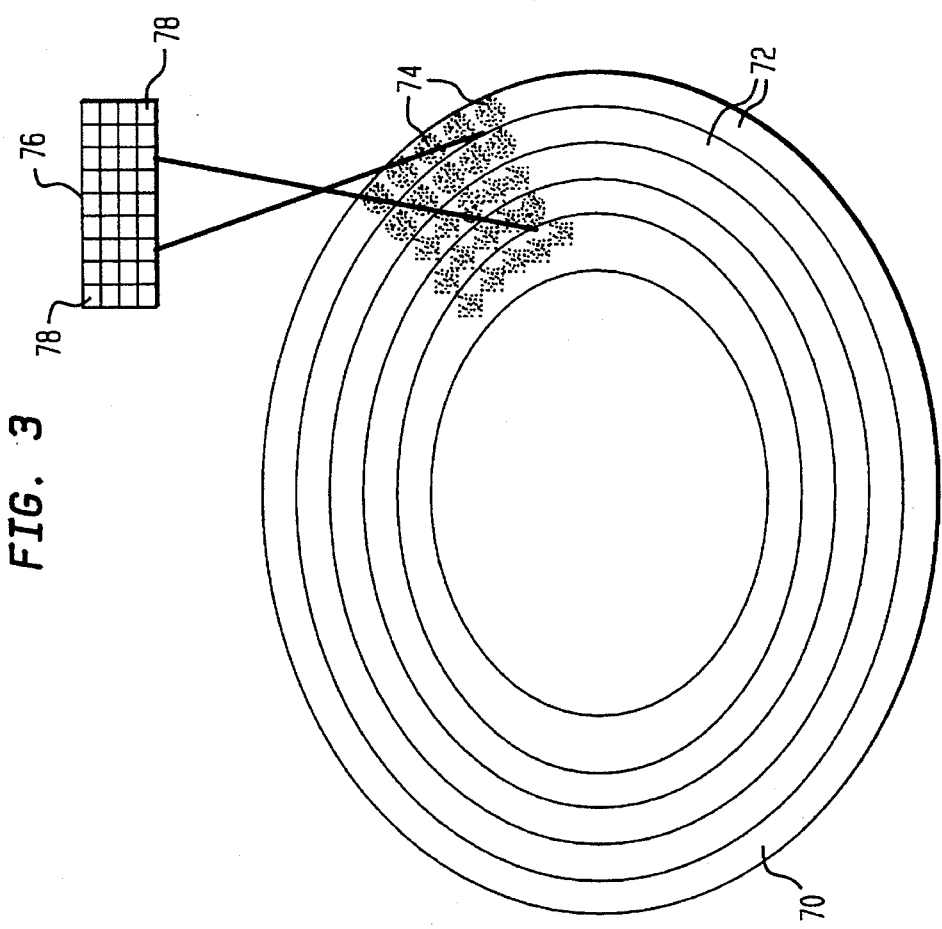
FIG. 3 is an illustration of the patterns on a prerecorded optical memory disk.

Looking now at FIG. 3, the patterns on a prerecorded optical memory disk are schematically illustrated. A disk 70 is divided into a plurality of tracks 72. Data spot 74 are imprinted on the tracks. The spaces between two data spots in a tracks are called non-data spots. Disk 70 is imaged by a CCD/TDI matrix (not shown) whose projection 76 is a matrix of pixels 78 wherein each data spot is imaged by at least one pixel. In a preferred embodiment of the invention each track cross-section is imaged by more than one pixels. When the disk is rotated the data spots 74 are swept along the TDI direction and the light gathered by the detectors in the CCD/TDI detector matrix along the TDI direction is accumulated and processed in an image processor unit (not shown) to produce an image of the track.

In contrast with laser illumination systems a focused LED illumination system in accordance with the present invention illuminates a relatively wide area and not a diffraction limited spot. The required signal levels are achieved by the integration process which is performed by the CCD/TDI detector matrix. The integration time is matched to the scan velocity of the disk.

Figure 4:
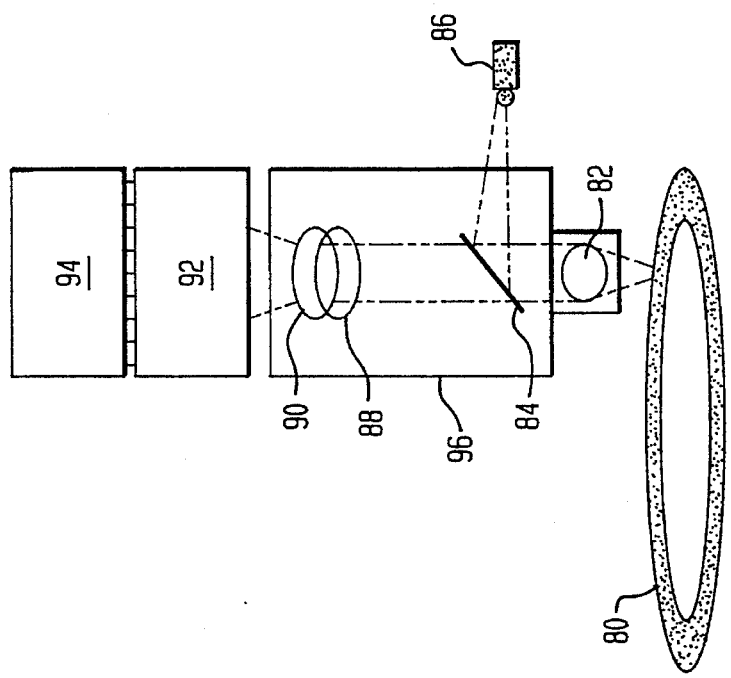
FIG. 4 illustrates an experimental setup used to generate an image of a CD ROM using a LED.

FIG. 4 shows a laboratory setup which was used for generating a picture of a CD-ROM. The setup comprised a CD ROM 80, positioned under an Olympus BHMJL microscope 96. The objective used was Olympus LWD MSPL20X-LCD1.1, 82, the eyepiece lens was NFK 6.7× 88, the camera adaptor lens (0.3×) 92, a Dalsa CA-D1 frame camera 92, imaging MFG frame grabber 94, connected to a PC (not shown). The LED used was a red HP LED HLMP 8109, using a central wavelength of 645 nm.

All the above description of preferred embodiments has been provided for the purpose of illustration, and is not intended to limit the invention in any way. Many modifications can be effected in the system of the invention. For instance, different LED origins can be used, different optical systems, lenses etc. can be assembled, or different detecting means can be used, all without exceeding the scope of the invention.

I claim:

1. An optical disk reader system comprising:
   an LED illuminator for illuminating at least a part of one track of an optical disk;
   means for detecting light reflected from the optical disk illuminated by said LED illuminator; and
   means for summing the light reflected along a track direction detected by said detecting means.

2. A system according to claim 1, wherein said means for detecting light reflected from the optical disk and for summing the light reflected along the track direction comprise a CCD/TDI detector.

3. A system according to claim 1, comprising:
   an LED illuminator for illuminating at least one track of an optical disk;
   an optical system for projecting at least part of the beam from said LED illuminator onto the optical disk, and for imaging the illuminated area of the disk onto a detector;
   a detector for detecting said beam reflected from said optical disk and for converting said detected light into an electrical signal; and
   a processor for processing said electric signal.

4. A system according to claim 1 or 3, comprising a bandpass filter for passing at least part of the light emitted by said LED illuminator.

5. A method for reading data from an optical memory disk, comprising illuminating at least one track of an optical memory disk with a beam from an LED illuminator, collimating at least a part of the beam from said LED illuminator and part of the light reflected from said illuminated optical memory disk, detecting said reflected light and summing the light reflected along a track direction, converting said reflected light into an electric signal, and processing said electric signal.

* * * * *

UNITED STATES PATENT AND TRADEMARK OFFICE
CERTIFICATE OF CORRECTION

PATENT NO.   :   5,566,159
DATED        :   October 15, 1996
INVENTOR(S)  :   Shapira It is certified that error appears in the above-identified patent and that said Letters Patent is hereby corrected as shown below:

Column 1, line 35, "PCO" should read --PDO--.

Column 3, line 25 "i" should read --is--.

Column 4, line 29, "16" should read --15--.

Column 6, line 27, "electrical" should read --electric--.

Signed and Sealed this

Fourteenth Day of January, 1997

Attest:

BRUCE LEHMAN

*Attesting Officer*    *Commissioner of Patents and Trademarks*